(12) United States Patent
Lee

(10) Patent No.: US 6,169,733 B1
(45) Date of Patent: Jan. 2, 2001

(54) MULTIPLE MODE CAPABLE RADIO RECEIVER DEVICE

(75) Inventor: Michael C. G. Lee, Ottawa (CA)

(73) Assignee: Northern Telecom Limited, Montreal (CA)

(*) Notice: Under 35 U.S.C. 154(b), the term of this patent shall be extended for 0 days.

(21) Appl. No.: 08/855,846

(22) Filed: May 12, 1997

(51) Int. Cl.[7] .................................................. H04B 7/216
(52) U.S. Cl. ............................................. 370/342; 455/552
(58) Field of Search ................................. 375/267, 299, 375/349, 356, 347; 455/59, 131, 139, 161.2, 132, 150.1, 552, 553; 370/312, 320, 321, 334, 335, 342, 465, 466, 481, 486, 487, 318, 319, 337

(56) References Cited

U.S. PATENT DOCUMENTS

| | | | |
|---|---|---|---|
| 5,668,837 | * 9/1997 | Dent | 375/316 |
| 5,745,480 | * 4/1998 | Behtash et al. | 370/252 |
| 5,754,542 | * 5/1998 | Ault et al. | 370/342 |

FOREIGN PATENT DOCUMENTS

| | | | | |
|---|---|---|---|---|
| 629097 | * 6/1904 | (EP) | | H04Q 7/04 |
| 701337 | * 3/1996 | (EP) | | H04B 7/26 |
| 9519079 | * 7/1905 | (WO) | | H04J 4/00 |

* cited by examiner

*Primary Examiner*—Ajit Patel
*Assistant Examiner*—Chiho Andrew Lee (57) ABSTRACT

A mobile handset is able to receive and transmit to base stations operating in compliance with different standards, for example CDMA, TDMA or AMPS. The mobile handset converts the received signal down to baseband and digitizes only a single channel at a time rather than the whole band. The channel chosen is the biggest of the various transmission systems used. For example, the channel widths for CDMA, TDMA and AMPS are, respectively 1.25 MHz, 30 KHz and 30 KHz. Accordingly to deal with these three systems a 1.25 MHz channel is digitized. Thereafter a digital signal processor determines which of the three systems is being used and appropriate processing and demodulation is carried out.

18 Claims, 5 Drawing Sheets

MULTIPLE MODE CAPABLE RADIO RECEIVER DEVICE

FIELD OF THE INVENTION

This invention relates to wireless and particularly but not exclusively to radio receivers used in mobile communication systems.

BACKGROUND OF THE INVENTION

There are currently many different radio standards in existence in North America and elsewhere. For example, in North America the frequency band 824–894 MHz (824 to 849 MHz for handset transmit and 869 to 894 MHz for handset receive) is reserved for cellular communication systems among which are AMPS (Analog Mobile Phone System) analog cellular defined by the standard EIA/TIA-553 (Electronic Industry Association/Telecommunications Industry Association Standard 553), TDMA (Time Division Multiple Access) digital cellular defined by the standard EIA/TIA/IS-136 (where IS means Interim Standard) and CDMA (Code Division Multiple Access) digital cellular defined by the standard EIA/TIA/IS-95. The frequency band 1850–1990 MHz (1850 to 1910 MHz for handset transmit and 1930 to 1990 MHz for handset receive) is, on the other hand, reserved for PCS (Personal Communications Systems) and the two main standards operating in this band are J-Std-009 which defines upband TDMA and J-Std-008 which defines upband CDMA.

A radio receiver designed to operate in compliance with one of the standards is not generally able to operate with any of the other standards.

SUMMARY OF THE INVENTION

It is an object of the present invention to provide a single radio receiver which is able to communicate with a plurality of different radio systems.

According to one aspect, the present invention provides a radio receiver for reception of radio signals encoded according to a plurality of different protocols but transmitted within a common frequency band, the receiver comprising: at least one downconversion stage for deriving baseband information in a selected frequency band having a width substantially equal to the maximum channel width used in the different protocols; an A/D conversion stage for converting the baseband information in the selected frequency band to digital information; and a digital signal processor for processing the digital information corresponding to the baseband information in the selected frequency band, wherein the digital signal processor first determines whether the digital information corresponds to a single channel of a first particular one of the protocols, if the digital signal processor determines that the digital information corresponds to a single channel of the first protocol the digital signal processor processes the digital information according to the first protocol, if the digital signal processor determines that the digital information does not correspond to a single channel of the first protocol the digital signal processor subsequently filters out a single channel of another particular one of these protocols, determines whether the digital information in the filtered single channel corresponds to the other protocol and, if it does correspond, processes the digital information in the filtered single channel according to the other protocol.

In a preferred embodiment the common frequency band is 869–894 MHz and the different protocols are AMPS, CDMA and TDMA, and the selected frequency bandwidth of the baseband information is 1.25 MHz.

Alternatively or additionally the common frequency band is 1930–1990 MHz and the different protocols are CDMA and TDMA, and the selected frequency bandwidth of the baseband information is 1.25 MHz.

The invention also provides a radio receiver comprising a first receiver portion for reception of radio signals encoded according to a plurality of different protocols but transmitted within a first common frequency band and a second receiver portion connected in parallel to the first receiver portion for reception of radio signals encoded according to a plurality of different protocols but transmitted within a second common frequency band, the first receiver portion comprising: at least one downconversion stage for deriving baseband information in a selected frequency band having a width substantially equal to the maximum channel width used in the different protocols; the second receiver portion comprising: at least one downconversion stage for deriving baseband information in a selected frequency band having a width substantially equal to the maximum channel width used in the different protocols; the radio receiver further comprising: an A/D conversion stage connected to outputs of the first and second receiver portions for converting the baseband information in the selected frequency band to digital information; and a digital signal processor for processing the digital information corresponding to the baseband information in the selected frequency band, whereby the particular protocol used can be discerned and the digital information processed accordingly.

BRIEF DESCRIPTION OF THE DRAWINGS

A preferred embodiment of this invention will now be described with reference to the attached drawings in which.

DETAILED DESCRIPTION OF THE PREFERRED EMBODIMENT

Figure 1:
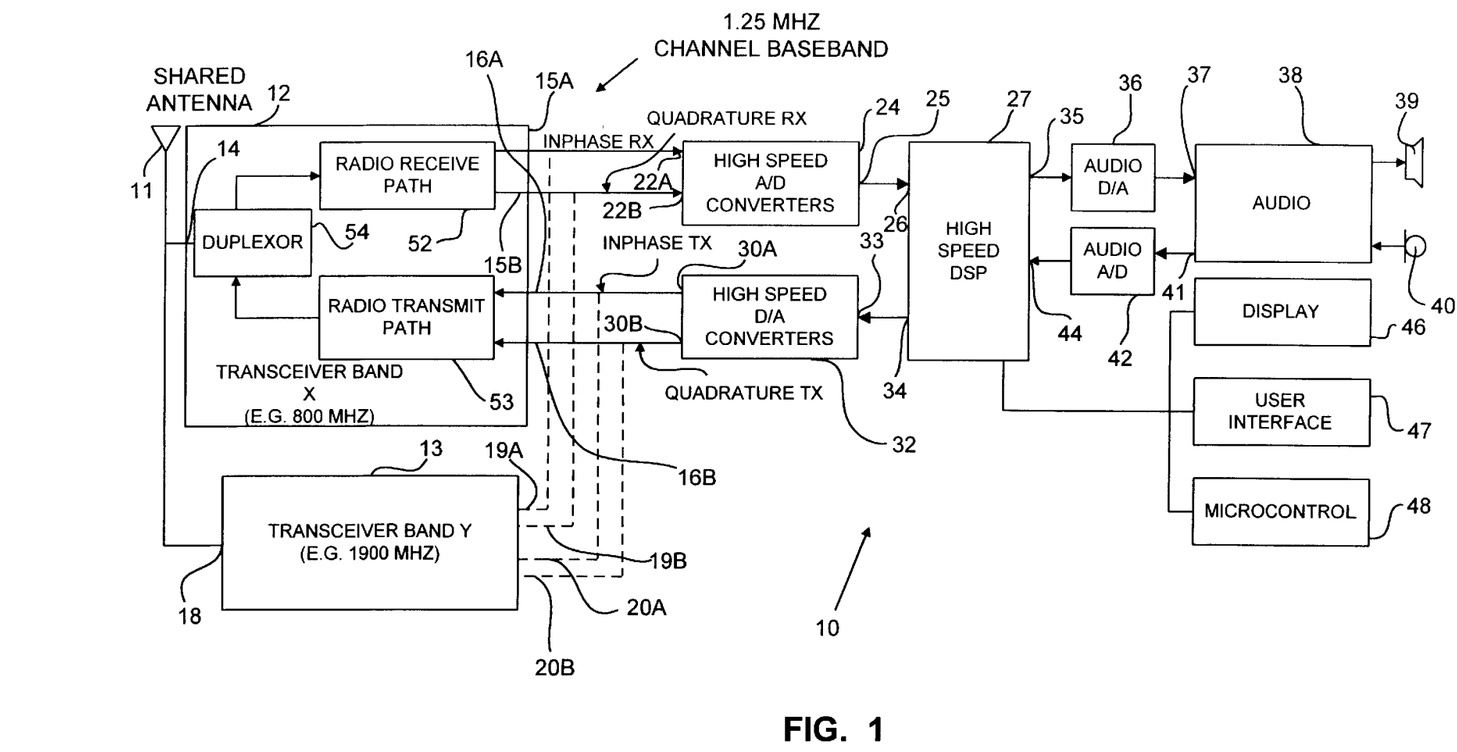
FIG. 1 is a block diagram of a mobile transceiver constructed according to the present invention.

Referring to FIG. 1, a mobile handset 10 has an antenna 11 to which are connected a first transceiver portion 12 and a second transceiver portion 13. Transceiver portion 12 has a signal input 14 from the antenna, receive outputs 15a and 15b and transmit inputs 16a and 16b. Similarly transceiver portion 13 has a signal input 18 from the antenna, receive outputs 19a and 19b and transmit inputs 20a and 20b.

Receive outputs 15a and 15b are connected to respective inputs 22a and 22b of high speed A/D (analog/digital) converters 24 having an output 25 connected to an input 26 of a high speed DSP (digital signal processor) 27. The A/D converters 24 incorporate a parallel to series converter (not shown). Receive outputs 19a and 19b are also connected respectively to inputs 22a and 22b.

Transmit inputs 16a and 16b are connected to respective outputs 30a and 30b of high speed D/A (digital/analog) converters 32 having an input 33 connected to an output 34 of the DSP 27. The D/A converters 32 incorporate a series to parallel converter (not shown). Transmit inputs 20a and 20b are also connected respectively to outputs 30a and 30b.

The DSP 27 has an output 35 connected through an audio D/A converter 36 to an input 37 of the handset audio transducer driver circuit 38. Audio circuit 38 is connected to a speaker 39 and a microphone 40. Audio circuit 38 has an output 41 connected through an audio A/D converter 42 to an input 44 of DSP 27.

The handset 10 also has a display 46, user interface (keypad) 47 and a microcontrol circuit 48 which is interconnected to the display 46 and the user interface 47 so as to control them. The microcontrol circuit is also connected to the DSP 27.

The details of the transceiver portion 12 are not critical to the operation of the invention. Any transceiver which is capable of converting the radio signals received at input 14 down to baseband with the correct channel bandwidth is acceptable. A single conversion type is shown but a dual conversion type could be used instead. In the specific embodiment shown the transceiver comprises a receive side 52 and a transmit side 53 both connected through a duplexer 54 to the signal input 14.

Figure 2:
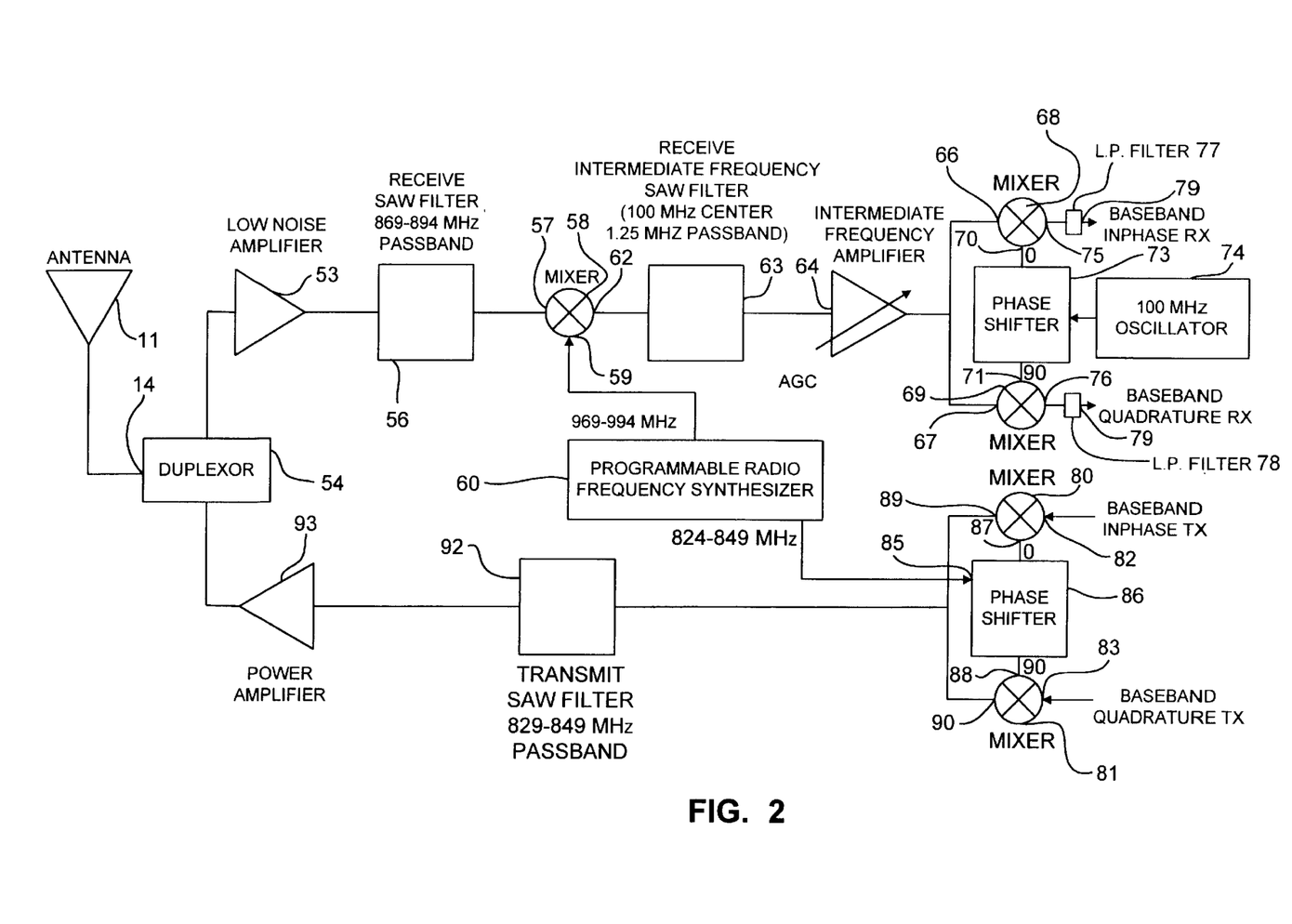
FIG. 2 is a block diagram showing details of the front end of the mobile transceiver of FIG. 1.

Referring now to FIG. 2, the receive side 52 includes a low noise amplifier 55 connected between the duplexer 54 and a surface acoustic wave (SAW) passband filter 56 the output of which is connected to an input 57 of a mixer 58 which has another input 59 connected to a programmable RF synthesizer 60. An output 62 of mixer 58 is connected to a SAW channel filter 63 which is in turn connected to an IF amplifier 64. The output of the IF amplifier 64 is split and connected to the inputs 66 and 67 of two mixers 68 and 69 respectively. The mixers 68 and 69 each have another input 70 and 71 respectively. A phase shifter 73 driven by a local oscillator (LO) 74 supplies an in-phase component of the LO frequency to input 70 of mixer 68 and a quadrature component of the LO frequency to input 71 of mixer 69. Output 75 of mixer 68 and output 76 of mixer 69 are respectively connected through low-pass filters 77 and 78 which have outputs 79 and 79'. A Baseband Inphase Rx signal as will be explained below is derived at output 79 and a Baseband Quadrature Rx signal is derived at output 79' as will also be explained below. Outputs 79 and 79' correspond respectively to outputs 15a and 15b of FIG. 1.

Continuing to refer to FIG. 2, the transmit side includes two mixers 80 and 81 each of which has an input 82 and 83 which correspond respectively to inputs 16a and 16b shown in FIG. 1. A Baseband Inphase Tx signal is supplied to input 82 of mixer 80 and a Baseband Quadrature Tx signal is supplied to input 83 of mixer 81 as will be described below. The programmable RF synthesizer is connected to an input 85 of a phase shifter 86 connected to supply an inphase component of the frequency supplied by the RF synthesizer 60 to a second input 87 of mixer 80 and to supply a quadrature component to a second input 88 of mixer 81. The output 89 of mixer 80 and the output 90 of mixer 81 are both connected to a SAW passband filter 92 which is in turn connected through a power amplifier 93 to the duplexer 54.

In operation, signals received in antenna 11 are fed through the duplexer 54, amplified in amplifier 55 and filtered in SAW filter 56. Assuming the passband of filter 56 is 869–894 MHz, the full receive band of the cellular communication band is received. The filtered signal is then mixed in mixer 58 with a signal generated by the programmable RF synthesizer 60. The RF synthesizer is programmed to a particular frequency required to select a desired 1.25 MHz channel from the filtered signal passed to input 57 of mixer 58. Assume the desired channel is the first 1.25 MHz band in the full mobile receive band of 869 to 894 MHz. This means that the first channel lies between 869 MHz and 870.25 MHz within the full band. In this case the synthesizer 60 would be programmed to generate a frequency of 969 MHz. The output signal of mixer 58 is a combination of the sum and difference of the two signals being mixed, i.e. 969+869 MHz=1838 MHz and 969−869 MHz=100 MHz. The SAW filter 63 is centered on the intermediate frequency of 100 MHz and has a bandpass function which will pass only 1.25 MHz. Thus, the 100 MHz signal is passed and the 1838 MHz signal is rejected. Since the SAW bandwidth is 1.25 MHz, only one channel is passed.

The 100 MHz intermediate frequency is amplified in amplifier 64 and the amplified signal is mixed in mixer 68 with a 100 MHz signal from oscillator 74. The difference signal which is obtained at the output 75 of mixer 68 is a 1.25 MHz baseband channel, i.e., a channel extending essentially from DC to 1.25 MHz. The sum signal is removed by the low-pass filter 77.

The 100 MHz intermediate frequency signal is also mixed down to a 1.25 MHz baseband channel in mixer 67 using the quadrature component of the 100 MHz LO signal from phase shifter 73. Again, the sum signal is removed by filter 78 leaving the difference signal. Thus, at output 79 there is derived a 1.25 MHz Baseband Inphase Rx signal and at output 79' there is derived a 1.25 MHz Baseband Quadrature Rx signal.

This above described process of mixing down to baseband can be used to select any one of the 1.25 MHz channels simply by programming the synthesizer 60 to a different frequency.

Figure 3:
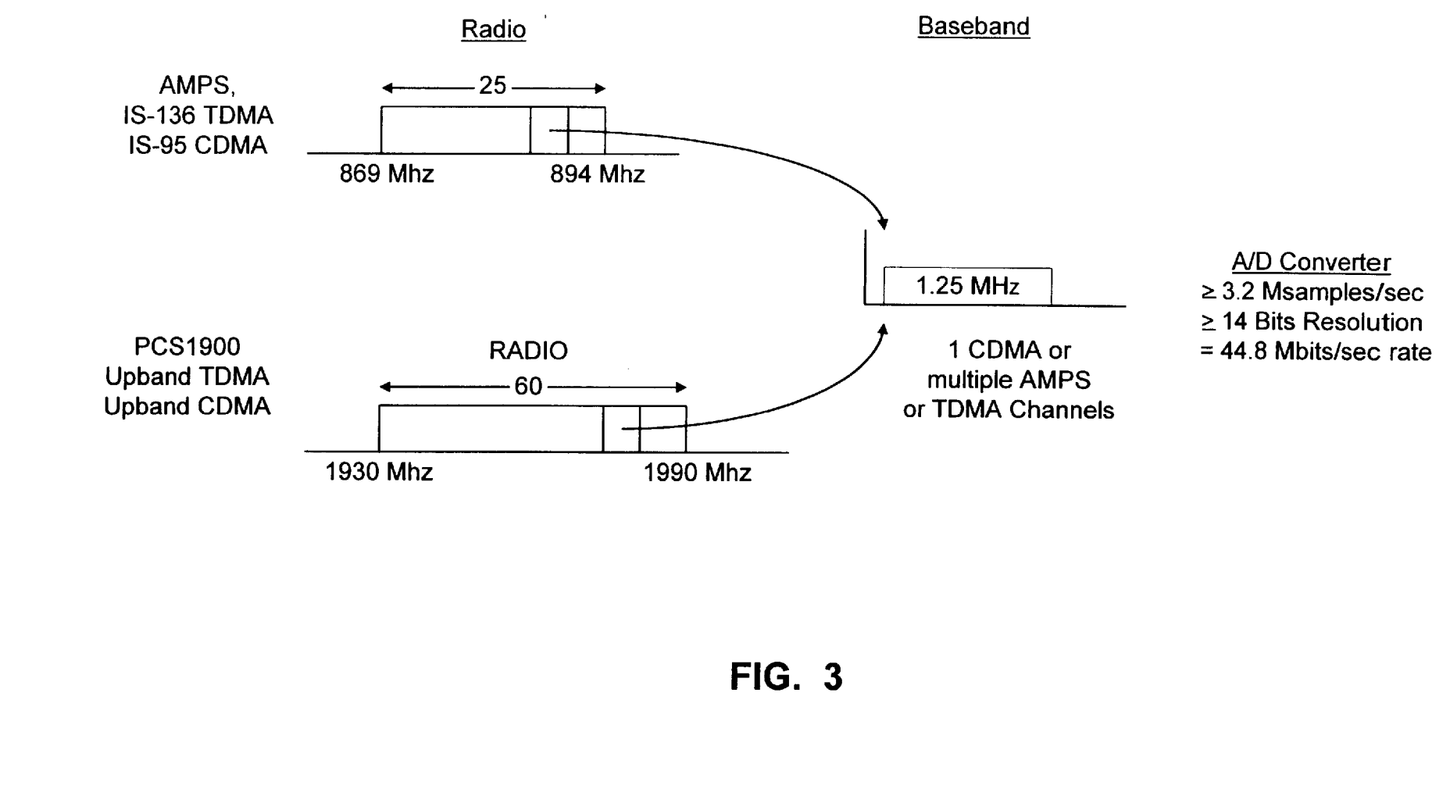
FIG. 3 illustrates an important aspect of the technique used in the invention.

The significance of the 1.25 MHz value may be ascertained from a consideration of FIG. 3. A single channel for the CDMA digital cellular standard is 1.25 MHz wide while for each of the AMPS analog cellular and TDMA digital cellular standards a single channel is 30 KHz wide. FIG. 3 shows that a 1.25 MHz wide channel from the 25 MHz passband is converted down to baseband. Transceiver portion 13 is identical to transceiver portion 12 except that it has a filter passband of 1930–1990 MHz and, if the received signals are in that range, again as shown in FIG. 3, a 1.25 MHz wide channel is converted down to baseband.

The 1.25 MHz wide signal is passed through the A/D converters 24 to reproduce the encoded digital information and this is then processed by the DSP 27 to derive the decoded digital data which is passed through the audio D/A converter 36 to audio driver circuit 38 causing an audio signal to be reproduced by speaker 39.

The actual processing steps carried out in DSP 27 will depend on the particular requirements of the cellular operating company. Each cellular operating company will have a preferred sequence of modes that the handset will operate in. For example, a particular cellular operating company may have CDMA service in one area, TDMA service in another area and AMPS in other areas. This company would prefer that the user use CDMA or TDMA if it is available and only use AMPS as a third choice or when roaming into another cellular operating company's territory. This is the example illustrated in the flowchart of FIGS. 4a and 4b.

Figure 4A:
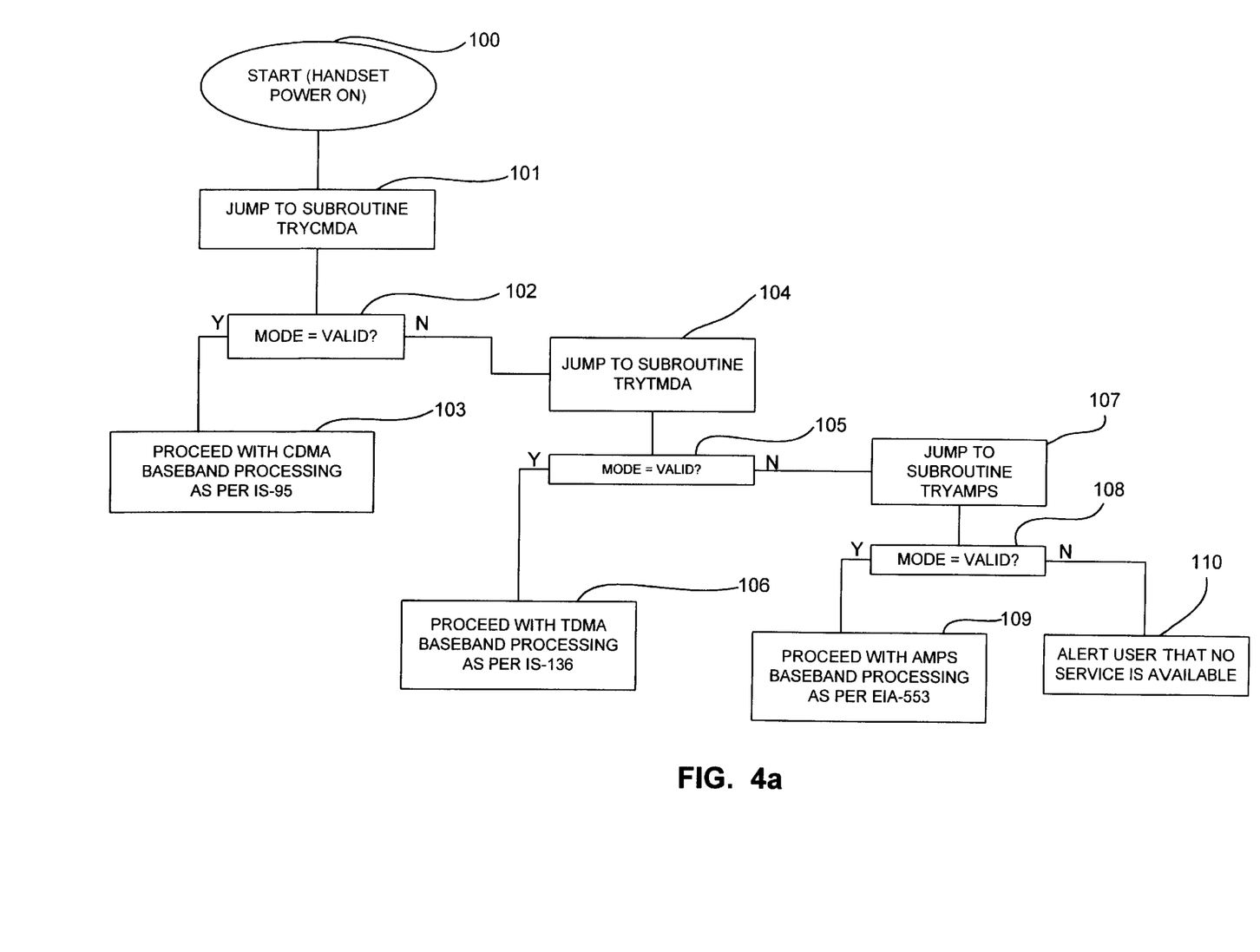
FIGS. 4a and 4b are flowcharts illustrating the steps carried out in the DSP algorithm.

Referring to FIG. 4a, with the handset on as indicated at step 100 the program moves to step 101 where a subroutine determines whether or not the received signal is a CDMA signal. As indicated in step 102 the result for the CDMA test may be valid or invalid. If it is valid, the program steps to block 103 for CDMA baseband processing as per EIA/TIA/IS-95, abbreviated to IS-95.

If the result of the CDMA test is invalid, the program steps instead to block 104 where another subroutine determines whether or not the received signal is a TDMA signal. Block 105 represents the outcome of this test, i.e., there is a valid or invalid result of the TDMA test. If the test result is valid, the program steps to block 106 for TDMA baseband processing as per EIA/TIA/IS-136, abbreviated to IS-136.

If the result of the TDMA test is invalid, the program steps instead to block 107 where a further subroutine determines whether or not the received signal is an AMPS signal. The result of this test is indicated in block 108. If the test indicates a valid AMPS signal, the program steps to block 109 where AMPS baseband processing in accordance with EIA/TIA-553, abbreviated to EIA-553, is carried out. Otherwise, the program steps to block 110 which indicates that the user is alerted that no service is available.

Figure 4B:
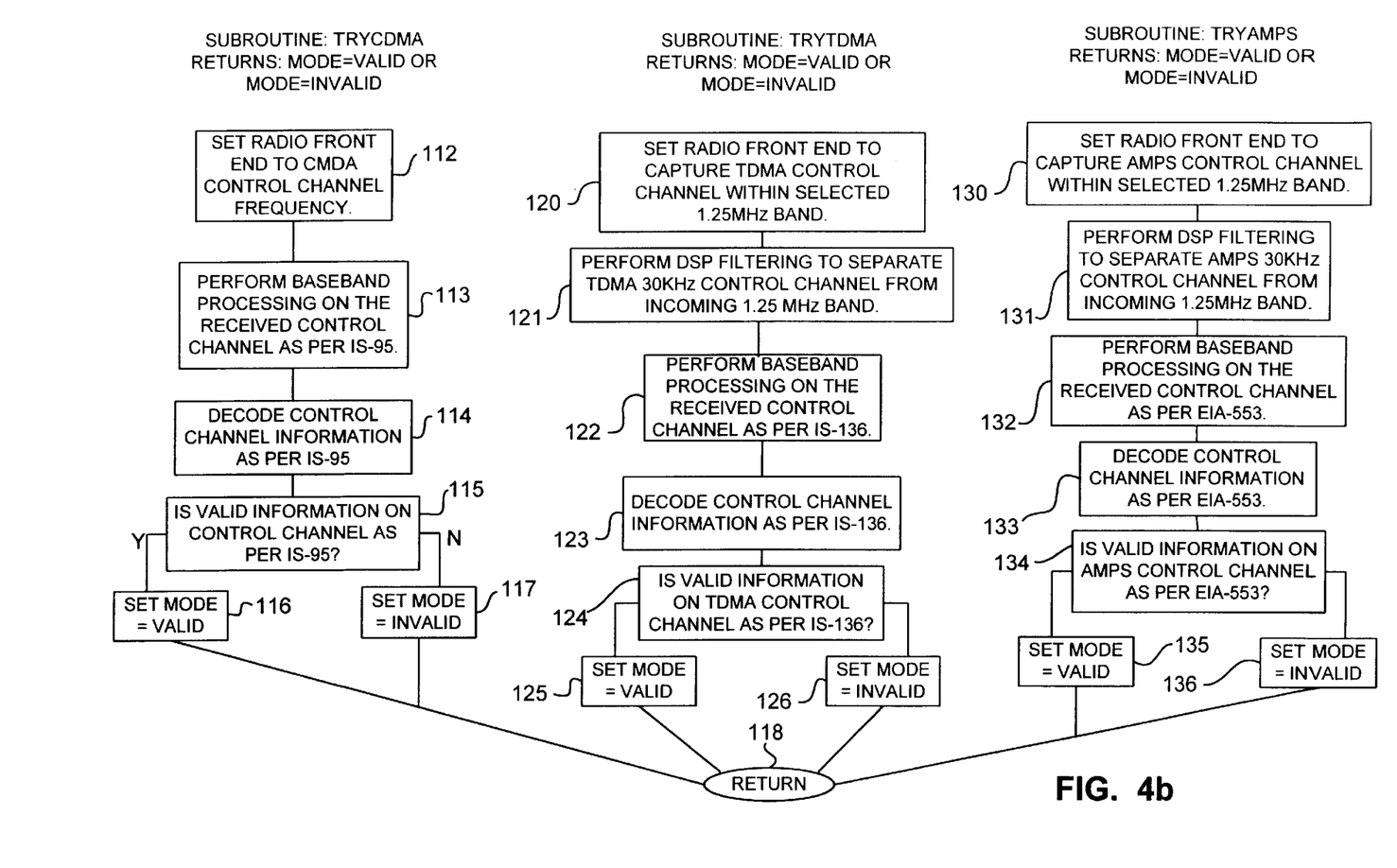

Referring now to FIG. 4b, the subroutines referred to in blocks 101, 104 and 107 will now be described. The subroutine TryCDMA begins by setting the radio front end to the CDMA control channel frequency as indicated at block 112. The subroutine then steps to block 113 where baseband processing on the received control channel is carried out as per IS-95. The subroutine then steps to block 114 where the control channel is decoded as per IS-95. A decision is then made in block 115 as to whether or not there is valid information on the control channel as per IS-95. This results either in a Set Mode=Valid outcome as shown in block 116 or a Set Mode=Invalid outcome as indicated in block 117. The subroutine then returns as indicated in block 118 to the main program.

The subroutine TryTDMA begins by setting the radio front end to capture the TDMA control channel within the selected 1.25 MHz band as indicated in block 120. Then, as indicated in block 121, DSP filtering is performed to separate the TDMA 30 KHz control channel from the incoming 1.25 MHz band. The next step to be carried out is illustrated in block 122, i.e., baseband processing on the received control channel as per IS-136 is performed. The next step is the decoding of control channel information as per IS-136. A decision is then made in block 124 as to whether or not there is valid information on the control channel as per IS-136. The outcome is either a Set Mode=Valid outcome 125 or a Set Mode=Invalid outcome 126 after which the subroutine returns to the main program.

The subroutine TryAMPS begins by setting the radio front end to capture the AMPS control channel within the selected 1.25 MHz band as illustrated at block 130. Thereafter, DSP filtering is performed to separate the AMPS 30 KHz control channel from the incoming 1.25 MHz band as shown at block 131. Next, baseband processing is performed on the received control channel as per EIA-553 as shown at block 132. The next step, illustrated by block 133, is to decode the control channel information as per EIA-553. A decision is then made in block 134 as to whether or not there is valid information on the AMPS control channel as per EIA-553. If there is, the outcome is a Set Mode=Valid outcome 135 and, if there is not, the outcome 136 is a Set Mode=Invalid. After that the subroutine returns to the main program.

It is noted that 14 bits of resolution is chosen for the A/D converters 24 at a sampling rate of 3.2 Mega bits per second. This sampling rate is greater than twice the signal bandwidth, so there will be no loss of information on A/D conversion. The 14 bits of resolution are required in order to handle a reasonably large dynamic range on the incoming baseband information.

The data from the A/D converters is then applied to the DSP 27. Normally the bitstream from the A/D converters 24 is applied to the DSP 27 in a serial bitstream fashion. The bitrate of this serial data stream will be 44.8 Mega bits per second. (A 14 bit parallel interface running at 3.2 MHz to the DSP 27 can also be considered in order to reduce the data rate to the DSP 27; however the parallel interface will increase the number of interface pins required).

The multiple mode capable radio receiver device will require a very powerful DSP device. Each 14 bit sample at the chosen 3.2 Mb/sec rate will occur every 312 nano seconds.

To separate AMPS or TDMA information from the 1.25 MHz channel requires a DSP implementation of a bandpass filter with approximately 70 db's of rejection 30 KHz removed from the passband. This level of filtering will require a minimum of a 10th order infinite impulse response (IIR) filter or a 256 tap finite impulse response (FIR) filter. The finite impulse response filter has the advantage that it has linear phase response which may be required by the application.

If an IIR filter is used, it requires approximately 5 DSP instructions per order for a total of 50 instructions. These 50 instructions must be executed continuously between each sample. Since a sample of 14 bits arrives every 312 nano seconds the minimum baseline DSP performance is 160 MIPS (million instructions per second). This level of performance is within reach of single chip DSP processors in the next few years. For example, the Texas Instruments C54 family of DSP devices has 50 MIPS now and is projected to have approximately 100 MIPS of processing power by the end of 1997.

If an FIR filter of 256 taps is used, it would require 256 DSP cycles between each data sample. This would require a minimum baseline performance of 820 MIPS. This level of DSP power would require multiple DSP devices or alternately a hardwired implementation of the FIR filter.

In TDMA or AMPS mode, the DSP must first perform the 30 KHz channel separation filtering and the proceed with the baseband processing. In CDMA mode, the channel separation step is bypassed and the DSP proceeds directly to the baseband processing. This baseband processing is specific depending on the mode of operation (AMPS, TDMA or CDMA). The baseband processing stage includes demodulation of the incoming baseband signals. For CDMA, TDMA and AMPS this involves demodulating respectively QPSK (Quadrature Phase Shift Keying) DQPSK (Differential Quadrature Phase Shift Keying) and FM (Frequency Modulation) modulated signals. The total approximate baseband DSP processing requirements are on the order of 5 MIPS for AMPS, 40 MIPS for TDMA, and 60 MIPS for CDMA.

According to the invention, A/D conversion and DSP processing are carried out on the maximum channel of interest, and not a wider band. This is in contrast to other software radio techniques which convert a very large section of radio bandwidth (for example the full 25 MHz band) to digital. By performing the A/D conversion on only the relevant information expected, the power consumption of the radio is much lower. (High speed A/D converters and high speed DSP have high power consumption). This reduced power consumption is of prime importance in a handset application.

The operation of the transmit side of the mobile handset will now be described. Once the handset has determined whether the base station is transmitting CDMA, TDMA or AMPS as described above, the DSP will determine the required modulation scheme for transmission to the base station. Assuming the base station is CDMA then as indicated above the modulation scheme is QPSK. Thus, audio input from microphone 40 results in digital data being supplied from audio A/D 42 to DSP 27 where it is encoded and together with D/A converters 32 produces Baseband Inphase Tx and Quadrature TX signals at inputs 16*a* and 16*b* of Transceiver 12 of FIG. 1.

Referring now to FIG. 2, the inphase and quadrature transmit signals are mixed with a radio frequency carrier signal generated by synthesizer 60.

The RF carrier is in the transmit range 824–849 MHz and will be selected according to the desired channel. The modulated carrier is then passed through filter 92 and amplified in power amplifier 93 and passed through duplexer 54 to antenna 11.

I claim:

1. A radio receiver comprising a first receiver portion for reception of radio signals encoded according to a plurality of different protocols but transmitted within a first common frequency band, each protocol specifying a bandwidth for a single communication channel, and a second receiver portion connected in parallel to the first receiver portion for reception of radio signals encoded according to a second plurality of different protocols but transmitted within a second common frequency band, each protocol specifying a bandwidth for a single communication channel, the first receiver portion comprising:

at least one downconversion stage for deriving baseband information in a selected frequency band having a width substantially equal to a largest one of the channel bandwidths used in the first plurality of different protocols;

the second receiver portion comprising:

at least one downconversion stage for deriving baseband information in a selected frequency band having a width substantially equal to a largest one of the channel bandwidths used in the second plurality of different protocols;

the radio receiver further comprising:

an A/D conversion stage connected to outputs of the first and second receiver portions for converting the baseband information in the selected frequency band to digital information; and a digital signal processor for processing the digital information corresponding to the baseband information in the selected frequency band, whereby the particular protocol used can be discerned and the digital information processed accordingly.

2. A radio receiver according to claim 1, wherein the digital signal processor first determines whether the digital information corresponds to a single channel of one of the protocols or to multiple channels of another protocol.

3. A radio receiver according to claim 2, wherein, if the digital signal processor determines that the digital information corresponds to multiple channels of another protocol, the digital signal processor subsequently filters out a single channel of the other protocol.

4. A radio receiver according to claim 1, wherein, with respect to the first receiver portion, the first common frequency band is 869–894 MHz and the different protocols are AMPS, CDMA and TDMA, and the selected frequency bandwidth of the baseband information is 1.25 MHz and, with respect to the second receiver portion, the second common frequency band is 1930–1990 MHz and the different protocols are CDMA and TDMA, and the selected frequency bandwidth of the baseband information is 1.25 MHz.

5. A radio receiver according to claim 2, wherein, with respect to the first receiver portion, the first common frequency band is 869–894 MHz and the different protocols are AMPS, CDMA and TDMA, and the selected frequency bandwidth of the baseband information is 1.25 MHz and, with respect to the second receiver portion, the second common frequency band is 1930–1990 MHz and the different protocols are CDMA and TDMA, and the selected frequency bandwidth of the baseband information is 1.25 MHz.

6. A radio receiver according to claim 3, wherein, with respect to the first receiver portion, the first common frequency band is 869–894 MHz and the different protocols are AMPS, CDMA and TDMA, and the selected frequency bandwidth of the baseband information is 1.25 MHz and, with respect to the second receiver portion, the second common frequency band is 1930–1990 MHz and the different protocols are CDMA and TDMA, and the selected frequency bandwidth of the baseband information is 1.25 MHz.

7. A radio receiver for reception of radio signals encoded according to a plurality of different protocols but transmitted within a common frequency band, each protocol specifying a bandwidth for a single communication channel, the receiver comprising:

at least one downconversion stage for deriving baseband information in a selected frequency band having a width substantially equal to a largest one of the channel bandwidths used in the different protocols;

an A/D conversion stage for converting the baseband information in the selected frequency band to digital information; and a digital signal processor for processing the digital information corresponding to the baseband information in the selected frequency band, wherein the digital signal processor first determines whether the digital information corresponds to a single channel of a first particular one of the protocols, if the digital signal processor determines that the digital information corresponds to a single channel of the first protocol the digital signal processor processes the digital information according to the first protocol, if the digital signal processor determines that the digital information does not correspond to a single channel of the first protocol the digital signal processor subsequently filters out a single channel of another particular one of these protocols, determines whether the digital information in the filtered single channel corresponds to the other protocol and, if it does correspond, processes the digital information in the filtered single channel according to the other protocol.

8. A radio receiver according to claim 7, wherein the digital signal processor, if it determines that the digital information in the filtered single channel does not correspond to the other protocol, determines whether the digital information in the filtered single channel corresponds to a further protocol and, if it does correspond, processes the digital information according to the further protocol.

9. A radio receiver according to claim 7, wherein the common frequency band is 869–894 MHz, the first protocol is CDMA and the other protocol is one of TDMA and AMPS, and the selected bandwidth of the baseband information is 1.25 MHz.

10. A radio receiver according to claim 8, wherein the common frequency band is 869–894 MHz, the first protocol is CDMA, the other protocol is one of TDMA and AMPS and the further protocol is TDMA if the other protocol is AMPS and is AMPS if the other protocol is TDMA, and the selected bandwidth of the baseband information is 1.25 MHz.

11. A radio receiver according to claim 7, wherein the common frequency band is 1930–1990 MHz, the first protocol is CDMA and the other protocol is TDMA, and the selected bandwidth of the baseband information is 1.25 MHz.

12. A radio receiver according to claim 7, wherein the at least one downconversion stage comprises:

an amplifier;

a passband filter for passing the common frequency band;

a programmable RF synthesizer;

a mixer having inputs supplied by the passband filter and the RF synthesizer;

a filter connected to an output of the mixer having a passband width substantially equal to the largest one of the channel bandwidths used in the different protocols.

13. A radio receiver according to claim 7, wherein the at least one downconversion stage derives an inphase component and a quadrature component of the baseband information.

14. A method of processing radio signals encoded according to a plurality of different protocols but transmitted within a common frequency band, each protocol specifying a bandwidth for a single communication channel, the method comprising the steps of:

receiving a radio signal;

downconverting the radio signal to derive baseband information in a selected frequency band having a width substantially equal to a largest one of the channel bandwidths used in the different protocols;

performing an analog to digital conversion on the baseband information in the selected frequency band to obtain digital information;

processing the digital information to determine the particular protocol used; and further processing the digital information according to the particular protocol determined;

wherein the step of processing the digital information to determine the particular protocol used comprises the substeps of:

determining whether the digital information corresponds to a single channel of a first particular one of the protocols;

if the digital information corresponds to a single channel of the first protocol, processing the digital information according to the first protocol;

if the digital information does not correspond to a single channel of the first protocol, filtering out a single channel of another one of the protocols;

determining whether the digital information in the filtered single channel corresponds to the other protocol and, if it does correspond, processing the digital information in the filtered single channel according to the other protocol.

15. A method according to claim 14, wherein the step of processing the digital information further comprises the substeps, in the event that the digital information in the filtered single channel does not correspond to the other protocol, of determining whether the digital information in the filtered single channel corresponds to a further protocol and, if it does correspond, processing the digital information according to the further protocol.

16. A method according to claim 14, wherein the common frequency band is 869–894 MHz, the first protocol is CDMA, the other protocol is one of TDMA and AMPS and the selected bandwidth of the baseband information is 1.25 MHz.

17. A method according to claim 15, wherein the common frequency band is 869–894 MHz, the first protocol is CDMA, the other protocol is one of TDMA and AMPS, the further protocol is TDMA if the other protocol is AMPS and is AMPS if the other protocol is TDMA, and the selected bandwidth of the baseband information is 1.25 MHz.

18. A method according to claim 14, wherein the common frequency band is 1930–1990 MHz, the first protocol is CDMA, the other protocol is TDMA, and the selected bandwidth is 1.25 MHz.

* * * * *